(12) United States Patent
Payyoor et al.

(10) Patent No.: US 12,215,633 B2
(45) Date of Patent: *Feb. 4, 2025

(54) MIDSHAFT RATING FOR TURBOMACHINE ENGINES

(71) Applicant: General Electric Company, Schenectady, NY (US)

(72) Inventors: Narayanan Payyoor, Thrissur (IN); Weize Kang, Mason, OH (US); Thomas Lee Becker, Symmes Township, OH (US); Richard Schmidt, Loveland, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,523

(22) Filed: Oct. 13, 2023

(65) Prior Publication Data
US 2024/0117770 A1   Apr. 11, 2024

Related U.S. Application Data

(63) Continuation of application No. 18/152,991, filed on Jan. 11, 2023, now Pat. No. 11,795,882, which is a
(Continued)

(51) Int. Cl.
*F02C 7/36*   (2006.01)
*F02C 7/06*   (2006.01)

(52) U.S. Cl.
CPC ............. *F02C 7/36* (2013.01); *F02C 7/06* (2013.01); *F05D 2240/54* (2013.01);
(Continued)

(58) Field of Classification Search
CPC ..... F01D 15/00; F01D 5/02; F02C 7/06; F02C 7/36; F05D 2240/60; F05D 2240/54; F05D 2240/61; F05D 2250/711; F05D 2300/603
See application file for complete search history.

(56) References Cited

U.S. PATENT DOCUMENTS 6,129,514 A * 10/2000 Shiga .................... F01D 5/28
                                                      415/199.5
6,174,130 B1   1/2001 King et al.
(Continued)

FOREIGN PATENT DOCUMENTS

| CN | 105822366 A | 8/2016 |
| EP | 0742634 A2 | 11/1996 |
| EP | 2842911 A1 | 3/2015 |

OTHER PUBLICATIONS

U.S. Appl. No. 17/328,800, filed May 24, 2021 [Cited in Parent].
(Continued)

*Primary Examiner* — Topaz L. Elliott
(74) *Attorney, Agent, or Firm* — Venable LLP; Peter T. Hrubiec; Michele V. Frank

(57) ABSTRACT

A turbomachine engine includes a core engine having one or more compressor sections, one or more turbine sections that includes a power turbine, and a combustion chamber in flow communication with the compressor sections and turbine sections. The turbomachine engine also includes a shaft coupled to the power turbine and characterized by a midshaft rating (MSR) between two hundred (ft/sec)$^{1/2}$ and three hundred (ft/sec)$^{1/2}$. In one aspect, the shaft has a redline speed between fifty and two hundred fifty feet per second (ft/sec). In another aspect, the shaft has a length L, an outer diameter D, and a ratio of L/D between twelve and thirty-seven.

20 Claims, 8 Drawing Sheets

Related U.S. Application Data continuation of application No. 17/328,795, filed on May 24, 2021, now Pat. No. 11,603,801.

(52) U.S. Cl.
CPC .... *F05D 2240/61* (2013.01); *F05D 2250/711* (2013.01); *F05D 2300/603* (2013.01)

(56) References Cited

U.S. PATENT DOCUMENTS

| | | | |
|---|---|---|---|
| 6,203,274 B1 * | 3/2001 | Kikuchi | F01D 5/02 415/213.1 |
| 6,368,057 B1 * | 4/2002 | Takahashi | F01D 1/04 415/199.5 |
| 6,749,518 B2 | 6/2004 | Carrier et al. | |
| 7,217,099 B2 | 5/2007 | Casanova et al. | |
| 7,331,757 B2 | 2/2008 | Janssen et al. | |
| 8,511,987 B2 | 8/2013 | Reinhardt et al. | |
| 8,656,584 B2 | 2/2014 | Gabriel et al. | |
| 9,464,669 B2 | 10/2016 | Kerr et al. | |
| 10,738,648 B2 | 8/2020 | Valencia | |
| 11,047,338 B2 | 6/2021 | Dievart et al. | |
| 11,181,046 B1 | 11/2021 | Brooks et al. | |
| 11,203,971 B2 | 12/2021 | Kannangara et al. | |
| 2005/0239562 A1 | 10/2005 | Lin et al. | |
| 2006/0034693 A1 | 2/2006 | Lardellier | |
| 2008/0148708 A1 | 6/2008 | Chou et al. | |
| 2010/0113170 A1 | 5/2010 | Schreiber et al. | |
| 2012/0257960 A1 | 10/2012 | Reinhardt et al. | |
| 2013/0052053 A1 | 2/2013 | Colson et al. | |
| 2015/0345504 A1 | 12/2015 | Kadau et al. | |
| 2016/0223011 A1 | 8/2016 | Lee et al. | |
| 2018/0003112 A1 | 1/2018 | Kupratis et al. | |
| 2019/0078609 A1 | 3/2019 | Mori et al. | |
| 2019/0153978 A1 | 5/2019 | Dievart et al. | |
| 2021/0095579 A1 * | 4/2021 | Alzuraiqi | F01K 23/101 |
| 2021/0108570 A1 | 4/2021 | Bemment | |
| 2021/0115811 A1 | 4/2021 | Arakawa et al. | |
| 2021/0189956 A1 | 6/2021 | Kannangara et al. | |
| 2021/0189971 A1 | 6/2021 | Gaskell et al. | |
| 2022/0136434 A1 | 5/2022 | Kannangara et al. | |
| 2022/0154597 A1 | 5/2022 | Unton | |

OTHER PUBLICATIONS

Office Action issued in U.S. Appl. No. 17/328,800 dated Jun. 15, 2022 [Cited in Parent].

Rauch, D. Design Study of an Air Pump and Integral Lift Engine ALF-504 Using the Lycoming 502 Core. NASA CR-120,992 (Year: 1972) [Cited in Parent].

Rotating Equipment Solutions. Shaft Length to Diameter Ratio (L/D)-API 617 Centrifugal Compressor Selection. https://www.linkedin.com/pulse/shaft-length-diameter-ratio-ld-api-617-centrifugal-solutions/ Dec. 21, 2020 (Year: 2020) [Cited in Parent].

* cited by examiner

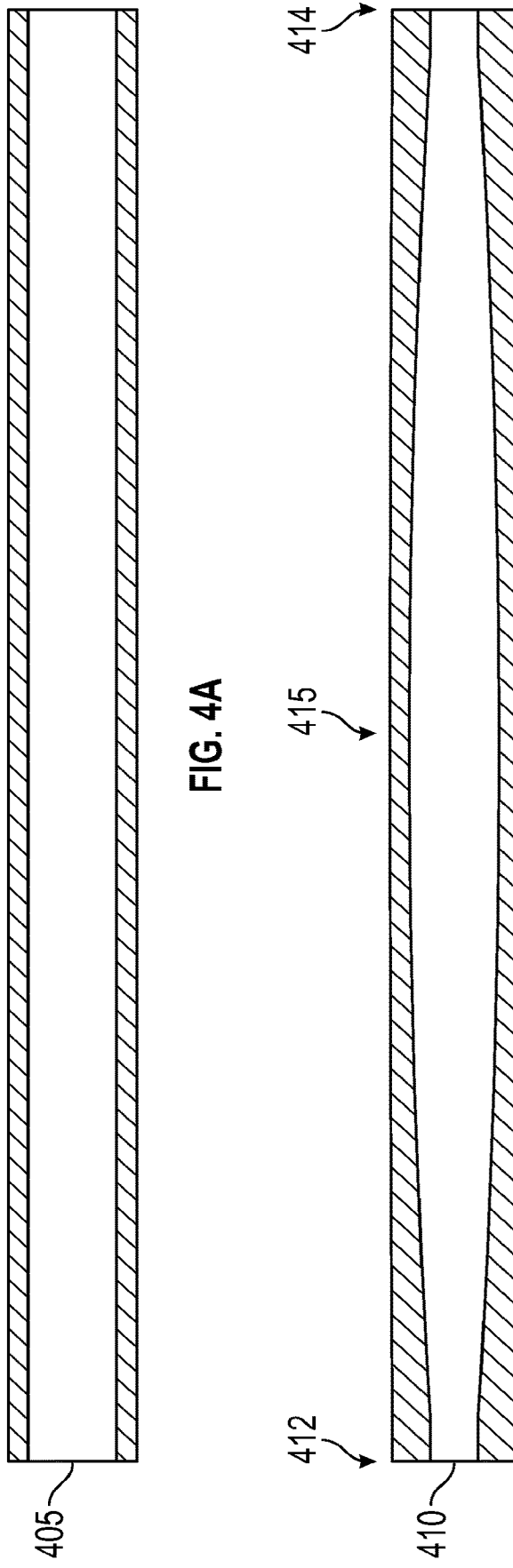
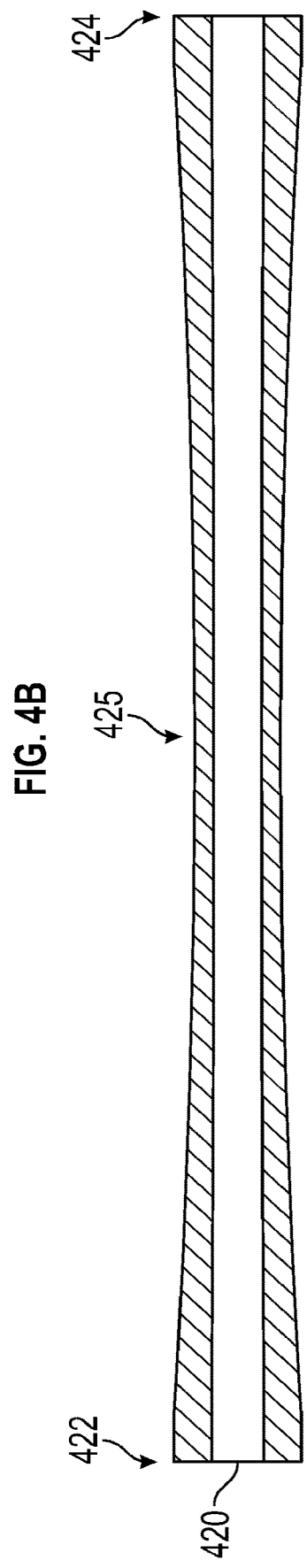
FIG. 4A  FIG. 4B  FIG. 4C

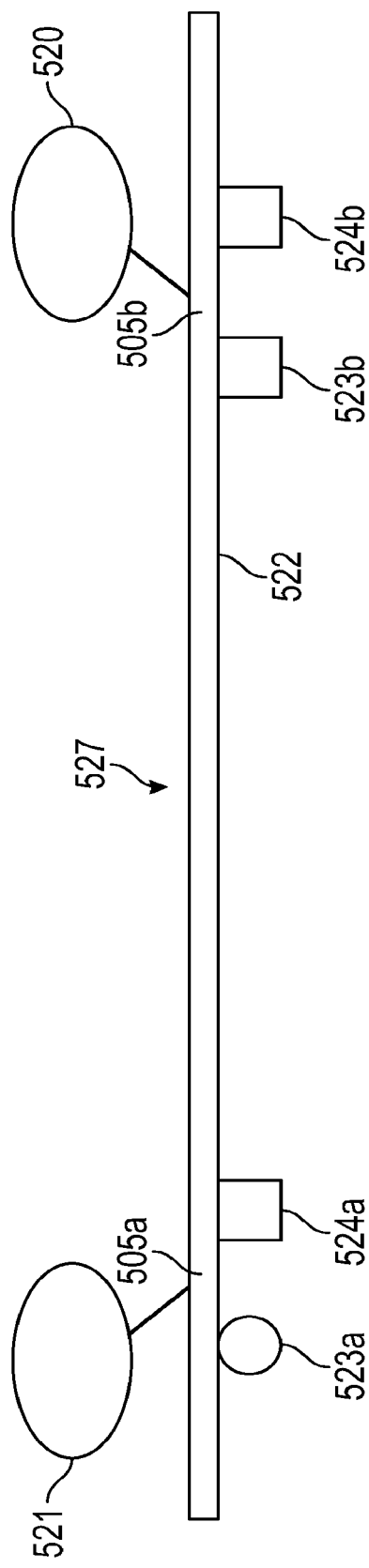
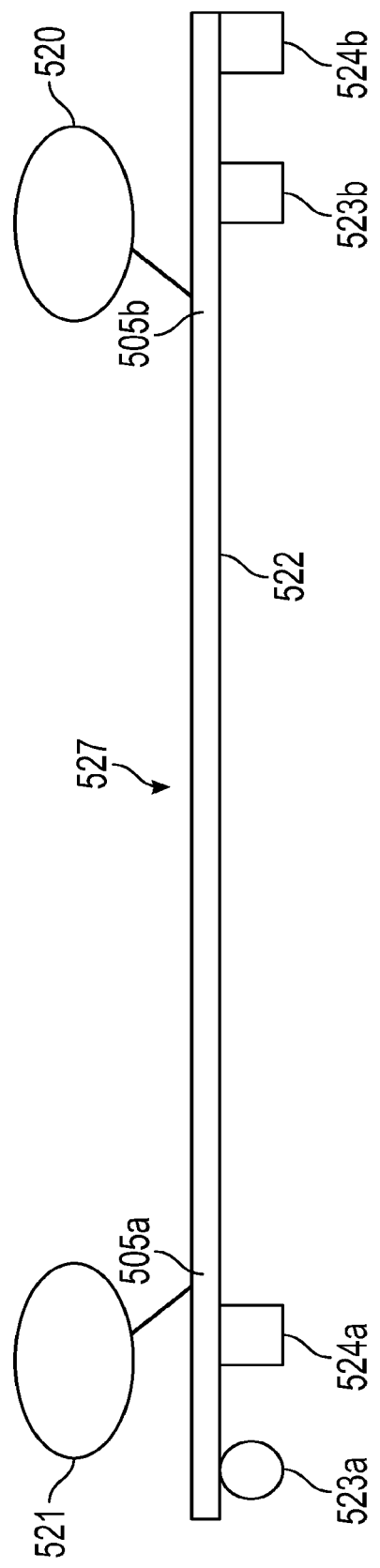
FIG. 5A
FIG. 5B

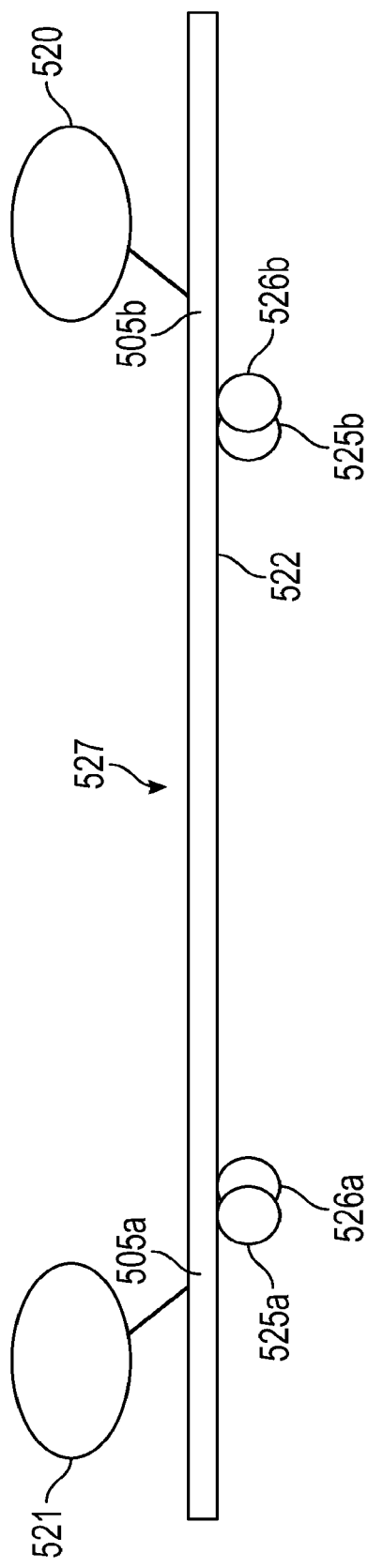
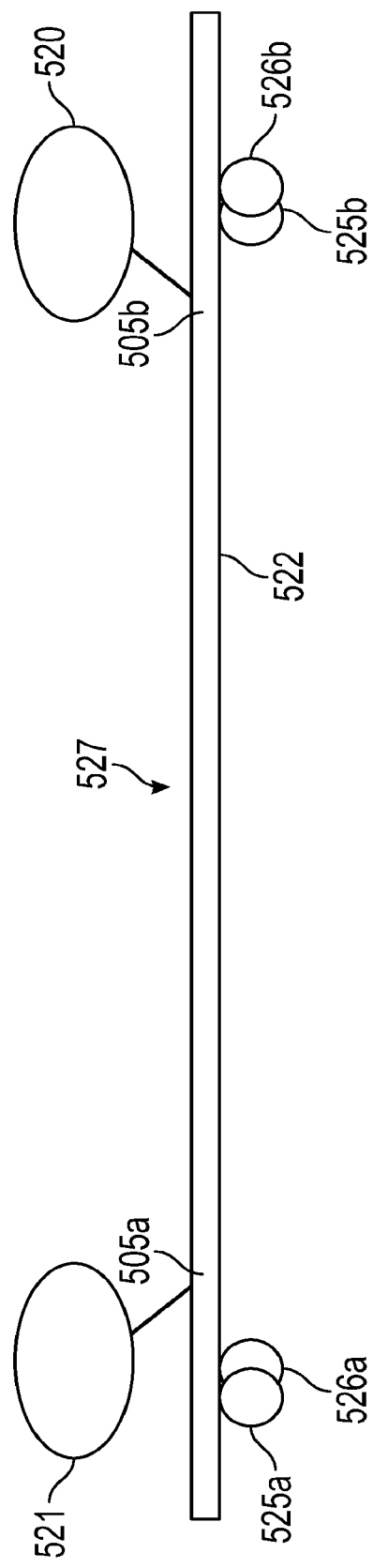

MIDSHAFT RATING FOR TURBOMACHINE ENGINES

CROSS-REFERENCE TO RELATED APPLICATIONS

This application is a continuation of U.S. patent application Ser. No. 18/152,991 filed on Jan. 11, 2023, which is a continuation of U.S. patent application Ser. No. 17/328,795 filed on May 24, 2021, which issued as U.S. Pat. No. 11,603,801 on Mar. 14, 2023, the entire contents of each of which are hereby incorporated by reference in their entireties.

TECHNICAL FIELD

This application is generally directed to turbomachine engines, including turbomachine shafts, and a method of driving such turbomachine shafts in such turbomachine engines.

BACKGROUND

A turbofan engine, or turbomachinery engine, includes a core engine and a power turbine that drives a bypass fan. The bypass fan generates the majority of the thrust of the turbofan engine. The generated thrust can be used to move a payload (e.g., an aircraft). A turbomachine shaft coupled to the power turbine and fan (either directly or through a gearbox) may be characterized by its first-order beam bending mode, the fundamental resonance frequency of this mode, and a critical speed of rotation that corresponds to the fundamental frequency. If this bending mode occurs within the standard operating range of the engine, undetected vibration as well as an increased risk of whirl instability may result. There is a continuing need to address vibrations induced by rotating shafts in turbomachinery engines.

BRIEF SUMMARY

According to an embodiment, a turbomachine engine includes a core engine having one or more compressor sections, one or more turbine sections that include a power turbine, and a combustion chamber in flow communication with the compressor sections and turbine sections. The turbomachine engine also includes a shaft coupled to the power turbine and characterized by a midshaft rating (MSR) between two hundred (ft/sec)$^{1/2}$ and three hundred (ft/sec)$^{1/2}$. In one aspect, the shaft has a redline speed between fifty and two hundred fifty feet per second (ft/sec). In another aspect, the shaft has a length L, an outer diameter D, and a ratio of L/D between twelve and thirty-seven.

Additional features, advantages, and embodiments of the present disclosure are set forth or apparent from consideration of the following detailed description, drawings, and claims. Moreover, it is to be understood that both the foregoing summary and the following detailed description are examples and intended to provide further explanation without limiting the scope of the disclosure as claimed.

BRIEF DESCRIPTION OF THE DRAWINGS

The foregoing and other features and advantages will be apparent from the following, more particular, description of various embodiments, as illustrated in the accompanying drawings, wherein like reference numbers generally indicate identical, functionally similar, and/or structurally similar elements.

FIG. 4A shows a cross section of a uniform shaft with a constant diameter and thickness.

FIG. 4B shows a cross section of a concave shaft with a constant diameter and a variable thickness.

FIG. 4C shows a cross section of a convex shaft with a variable diameter and a variable thickness.

FIG. 5A shows a shaft using a four-bearing straddle configuration.

FIG. 5B shows a shaft using a four-bearing outbound configuration.

FIG. 5C shows a shaft using an inbound duplex configuration.

FIG. 5D shows a shaft using an outbound duplex configuration.

DETAILED DESCRIPTION

Figure 1:
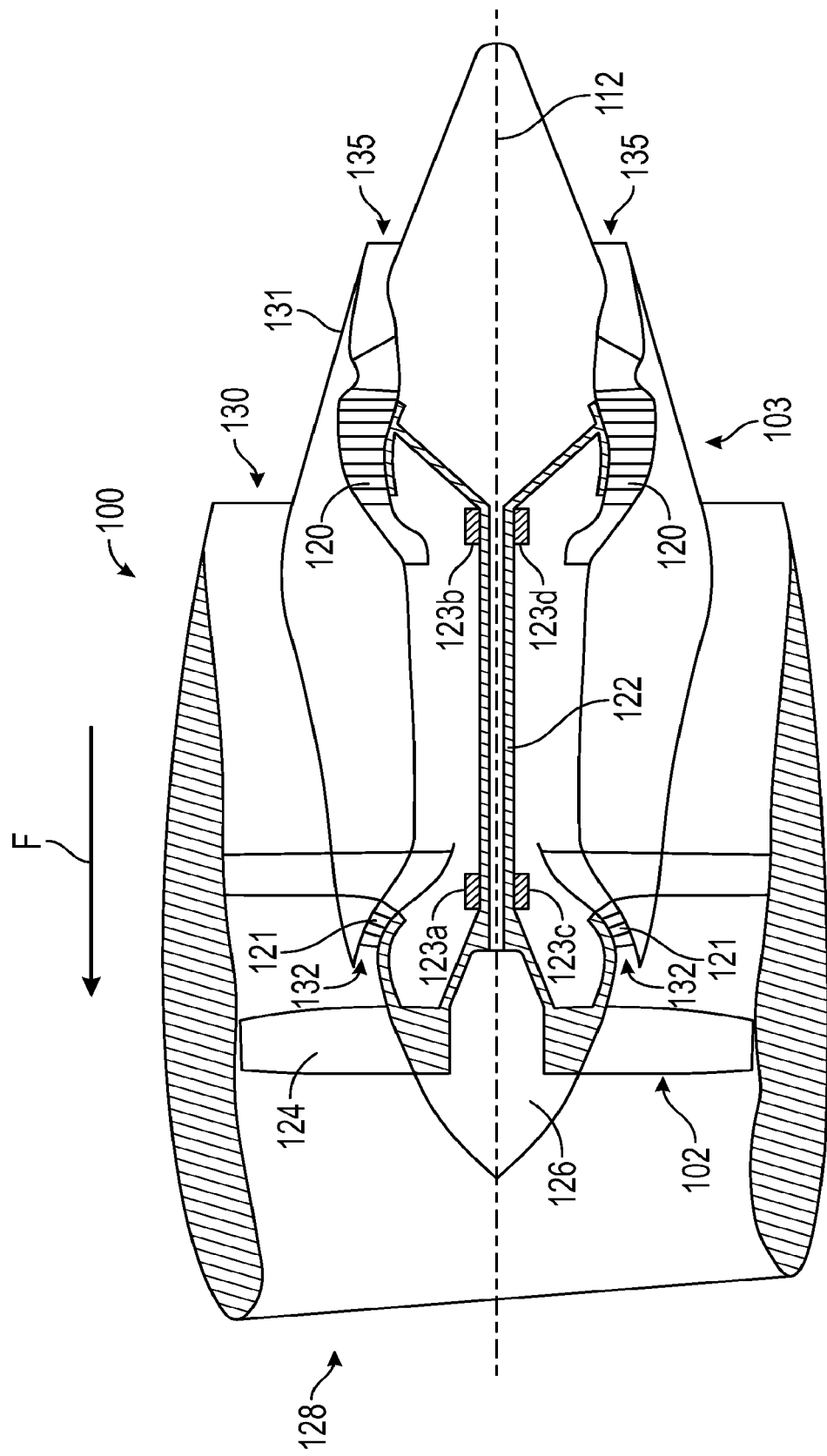
FIG. 1 shows a schematic, cross-sectional view of a gas turbine engine according to some embodiments of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like, refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides the thrust using an electrically-powered motor(s), a heat engine such as a turbomachine, or a combination of electrical motor(s) and a turbomachine.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second.

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" is a synonym for the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since its fundamental mode is below the redline speed. A "supercritical shaft" is a shaft that has a redline speed above the critical speed of the shaft.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

This disclosure and various embodiments relate to a turbomachinery engine, also referred to as a gas turbine engine, a turboprop engine, or a turbomachine. These turbomachinery engines can be applied across various technologies and industries. Various embodiments may be described herein in the context of aeronautical engines and aircraft machinery.

In some instances, a turbomachinery engine is configured as a direct drive engine. In other instances, a turbomachinery engine can be configured as a geared engine with a gearbox. In some instances, a propulsor of a turbomachinery engine can be a fan encased within a fan case and/or nacelle. This type of turbomachinery engine can be referred to as "a ducted engine." In other instances, a propulsor of a turbomachinery engine can be exposed (e.g., not within a fan case or a nacelle). This type of turbomachinery engine can be referred to as "an open rotor engine" or an "unducted engine."

Newer engine architectures may be characterized by faster shaft speeds for the low-pressure turbine (LPT), can have longer shafts to accommodate a longer core, and be required to operate within a more limited radial space. These requirements can result in reductions in stiffness-to-weight ratio, however, that have the effect of lowering the critical speed and/or limiting the available options for increasing the critical speed for the LPT shaft. Accordingly, different approaches for engine types, midshaft geometry, bearing support, and material compositions are required for next-generation turbomachine engines, to permit high-speed operation without resulting in an unstable bending mode during regular operation. The inventors, tasked with finding a suitable design to meet these requirements, conceived and tested a wide variety of shafts having different combinations of stiffness, material, bearing type and location, shaft length, and diameter in order to determine which embodiment(s) were most promising for a variety of contemplated engine designs. The various embodiments, as described herein and as shown in the figures, include turbomachine shafts that employ one or more of these techniques to increase the critical speed of the first-order bending mode.

FIG. 1 shows a schematic, cross-sectional view of an embodiment of a gas turbine engine 100 for an aircraft, and may incorporate one or more embodiments of the present disclosure. The gas turbine engine 100 can include a fan assembly 102 and a turbomachine 103. In some embodiments, the turbomachine 103 is a two-spool turbomachine that includes a high-speed system and a low-speed system.

The high-speed system of the turbomachine 103, which is not shown in FIG. 1, can include a high-pressure compressor, a high-pressure turbine, a combustor, and a high-speed shaft supported by bearings and connecting the high-pressure compressor and the high-pressure turbine. The high-speed shaft, components of the high-pressure compressor, and components of the high-pressure turbine all rotate around a centerline axis 112 of the gas turbine engine 100. The high-pressure compressor (or at least the rotating components thereof), the high-pressure turbine (or at least the rotating components thereof), and the high-speed shaft may be collectively referred to as a high-pressure spool of the gas turbine engine 100. The combustor is located between the high-pressure compressor and the high-pressure turbine. The combustor can include one or more configurations for receiving a mixture of fuel and air, and for providing a flow of combustion gases through the high-pressure turbine for driving the high-pressure spool.

The low-speed system of the turbomachine 103 can include a low-pressure turbine 120, a low-pressure compressor or booster 121, and a low-speed shaft 122 extending between and connecting the booster 121 and the low-pressure turbine 120. In some embodiments, the low-speed shaft 122 may extend further along the centerline axis 112 than is shown in FIG. 1.

The low-speed shaft 122 is supported on bearings 123a, 123b, 123c, 123d, which are mounted to support structures (not shown) of the gas turbine engine 100. At each position, only two bearings are shown in FIG. 1 for clarity, though it is contemplated that more than two bearings, e.g. 3 or 4 bearings forward and/or aft of the respective illustrated locations, may be arranged to support the low-speed shaft 122 at the respective positions, and may be evenly spaced or irregularly spaced depending on the geometry of the bearing supporting structure, and available space and clearances.

The low-speed shaft 122, components of the booster 121, and components of the low-pressure turbine 120 all rotate around the centerline axis 112 of the gas turbine engine 100, in either the same direction or a counter-rotating direction as that of the high-pressure spool. The booster 121 (or at least the rotating components thereof), the low-pressure turbine 120 (or at least the rotating components thereof), and the low-speed shaft 122 may collectively be referred to as a low-pressure spool 200 of the gas turbine engine 100, and is further described in FIG. 2.

The fan assembly 102 includes an array of fan blades 124 extending radially outward from a rotor disc 126. The gas turbine engine 100 has an intake side 128 and an exhaust side 130. In some embodiments, the gas turbine engine 100 is a multi-spool turbofan engine, in which a low-pressure spool connects the rotor disc 126 to a rotor (not shown in FIG. 1) of the low-pressure turbine 120, and a high-pressure spool connects the high-pressure compressor to a rotor (not shown in FIG. 1) of the high-pressure turbine.

The turbomachine 103 is generally encased in a cowl 131. Moreover, it will be appreciated that the cowl 131 defines at least in part an inlet 132 of the turbomachine 103 and an exhaust 135 of the turbomachine 103, and includes a turbomachinery flow path extending between the inlet 132 and the exhaust 135. In operation, air flows through fan assembly 102, and compressed air is supplied from the inlet 132 to the booster 121 and the high-pressure compressor. The highly compressed air proceeds along the turbomachinery flow path and is delivered to the combustor. The airflow from the combustor drives the high-pressure turbine and the low-pressure turbine 120, and the low-pressure turbine 120 drives the fan assembly 102 via the low-speed shaft 122.

For the embodiment shown in FIG. 1, the inlet 132 has an annular or an axisymmetric three hundred sixty-degree configuration, and provides a path for incoming atmospheric air to enter the turbomachinery flow path, as described above. Such a location may be advantageous for a variety of reasons, including management of icing performance as well as protecting the inlet 132 from various objects and materials as may be encountered in operation. It will be appreciated, however, that in other embodiments, the inlet 132 may be positioned at any other suitable location, e.g., arranged in a non-axisymmetric configuration, etc.

For reference purposes, FIG. 1 also depicts a forward or thrust direction with arrow F, which in turn defines the forward and aft portions of the system. As in the embodiment shown in FIG. 1, the fan assembly 102 is located forward of the turbomachine 103 in a "puller" configuration, and the exhaust 135 is located aft. As is depicted, the fan assembly 102 is driven by the turbomachine 103, and, more specifically, is driven by the low-pressure spool. More specifically, the gas turbine engine 100 in the embodiment shown in FIG. 1 includes a power gearbox (not shown in FIG. 1), and the fan assembly 102 is driven by the low-pressure spool of the turbomachine 103 across the power gearbox. The power gearbox may include a gearset for decreasing a rotational speed of the low-pressure spool relative to the low-pressure turbine 120, such that the fan assembly 102 may rotate at a slower rotational speed than does the low-pressure spool. In such a manner, the rotating fan blades 124 of the fan assembly 102 may rotate around the centerline axis 112 and generate thrust to propel the gas turbine engine 100, and, hence, an aircraft to which it is mounted, in the forward direction F. Other configurations are possible and contemplated within the scope of the present disclosure, such as what may be termed a "pusher" configuration embodiment in which the turbomachine 103 is located forward of the fan assembly 102.

It will be appreciated, however, that the gas turbine engine 100 depicted in FIG. 1 is by way of example only. In other embodiments, the gas turbine engine 100 may have any other suitable configuration, including, for example, any other suitable number of shafts or spools, fan blades, turbines, compressors, etc., and the power gearbox may have any suitable configuration, including, for example, a star gear configuration, a planet gear configuration, a single-stage, a multi-stage, epicyclic, non-epicyclic, etc. The fan assembly 102 may be any suitable fixed-pitched assembly or variable-pitched assembly. The gas turbine engine 100 may include additional components not shown in FIG. 1, such as vane assemblies and/or guide vanes, etc.

It should be appreciated that the terms "low" and "high," or their respective comparative degrees (e.g., "lower" and "higher", where applicable), when used with the compressor, turbine, shaft, or spool components, each refers to relative pressures and/or relative speeds within an engine unless otherwise specified. For example, a "low-speed shaft" defines a component configured to operate at a rotational speed, such as a maximum allowable rotational speed, which is lower than that of a "high-speed shaft" of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. It should further be appreciated that the terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

Figure 2:
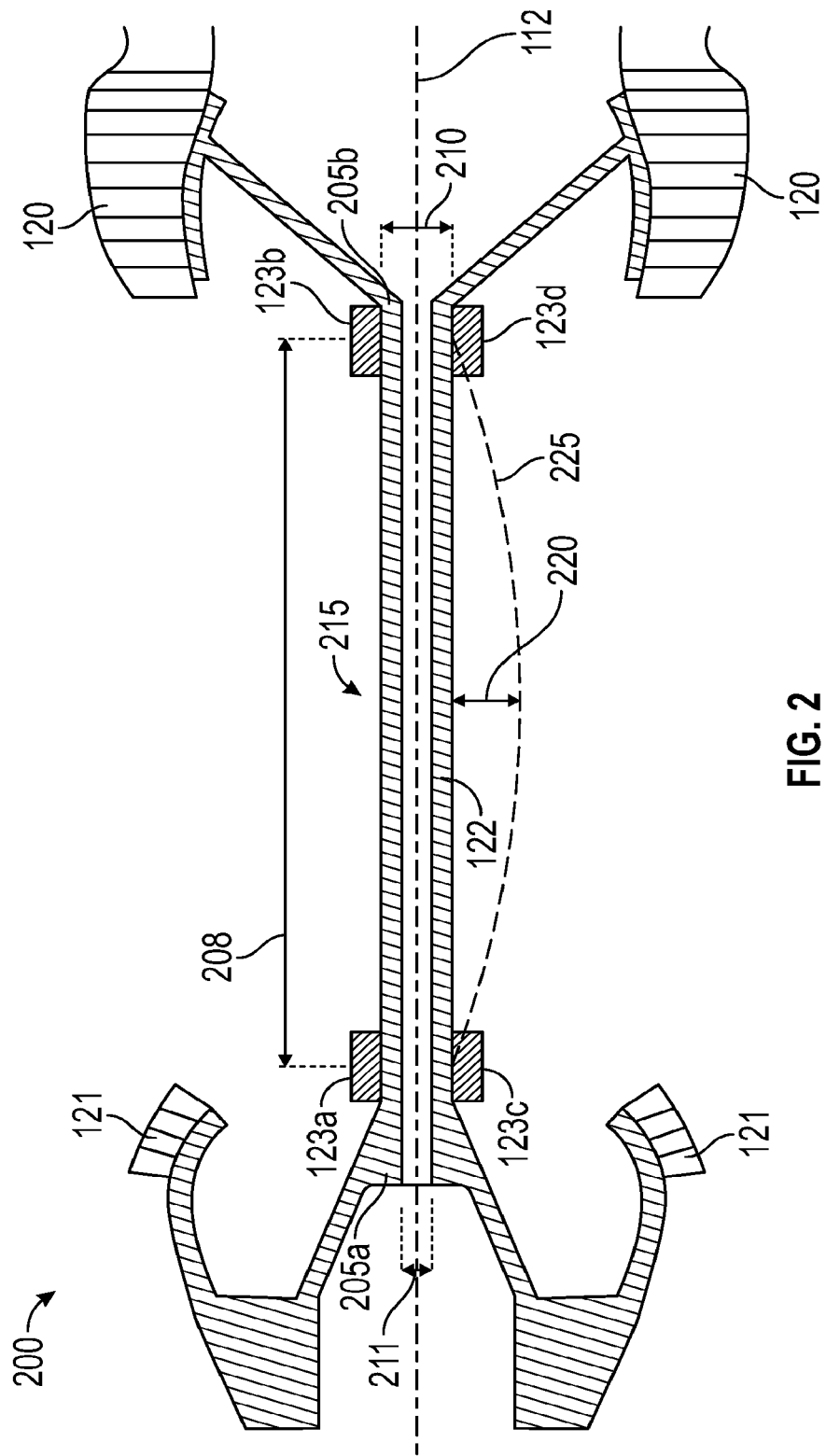
FIG. 2 shows an enlarged view of a portion of the cross-sectional view of FIG. 1.

FIG. 2 shows an enlarged view of a portion of the cross-sectional view of FIG. 1, that includes the low-pressure spool 200 according to some embodiments of the present disclosure. For example, a portion of the booster 121 and a portion of the low-pressure turbine 120 are shown mounted to the low-speed shaft 122 of the turbomachine 103, which in this example is a two-spool turbomachine. Alternatively, the low-speed shaft 122 may be an intermediate shaft in a three-spool turbomachine (not shown). The low-speed shaft 122 is supported by at least bearings 123a to 123d, which are located at mounting points 205a, 205b associated with a booster 121 location and a low-pressure turbine 120 location, respectively, for providing shaft rotational support at these locations. In the example of FIG. 2, bearings 123a, 123b, 123c, and 123d are all positioned inside of the mounting points 205a and 205b, which is referred to as an inbound bearing layout, or alternatively referred to as an overhung configuration for the booster 121 and low-pressure turbine 120. If the bearings were positioned outside of the mounting point 205b, then that would be referred to as an outbound layout. The bearings 123a to 123d can, however, be positioned at any point along the low-speed shaft 122, and may both be inbound, both be outbound, or one inbound and the other outbound.

The low-speed shaft 122 has a length "L" (indicated by arrow 208) and an outer diameter "D" (indicated by arrow 210). The low-speed shaft 122 can be hollow, with an inner diameter "d" indicated by arrow 211). In cases when the diameter of the low-speed shaft 122 varies along the length L, the outer diameter "D" and the inner diameter "d" may be defined at a midpoint of the low-speed shaft 122 (also referred to as the midshaft 215). The thickness may be defined as the thickness of the walls of the low-speed shaft 122 in embodiments in which the low-speed shaft 122 is hollow. A difference between a stated outer diameter D and inner diameter d of the low-speed shaft 122 may be understood as the shaft's wall thickness. In cases when the wall thickness varies along the length of the low-speed shaft 122, the thickness may be defined as the difference between the inner diameter and the outer diameter at the midshaft 215.

The length L can be understood as the portion of the low-speed shaft 122 between the bearings 123a to 123d and/or the mounting points 205a, 205b of engine components such as the booster 121 and the low-pressure turbine 120. For example, in the two-bearing arrangement of FIG. 2, the length L may be measured as the distance between midpoints of the bearings 123a to 123b, as indicated by the dashed vertical lines and arrow 208. For a four-bearing arrangement, there may be additional bearings along the shaft, in which case the length L may be measured as the distance between the midpoints of an innermost pair of bearings, or the distance between pairs or other groupings of bearings. In some embodiments, the length may be measured relative to specific bearings associated with specific engine components such as the booster 121 and the low-pressure turbine 120.

During operation, the low-speed shaft 122 rotates with a rotational speed that can be expressed in either rotations per minute (RPM), or as an outer diameter (OD) speed expressed in units of linear velocity, such as feet per second (ft/sec). The rotational stability of the low-speed shaft 122 relative to its operational range may be characterized by the resonance frequency of the fundamental or first order bending mode. When an operational speed is the same as this resonance frequency, the shaft is operating at its critical speed. The low-speed shaft 122, when supported by bearings 123a to 123d, has a mode shape for this first-order bending mode that may be generally described as a half-sinusoid, with a midshaft 215 location undergoing maximum displacement (indicated by arrow 220, which is exaggerated for clarity and is not to scale) and, therefore, having a maximum kinetic energy of displacement relative to other portions of the low-speed shaft 122. The fundamental mode shape is illustrated by dashed line 225 extending from bearing 123c to bearing 123d in FIG. 2, though this is only half of the amplitude of oscillation. This unstable mode is a standing wave across the length L of the low-speed shaft 122. The maximum deflection occurs when the excitation source has a periodicity or cyclic component near to the fundamental frequency. Since the bending mode is not active at the location of innermost bearings 123a to 123d for the low-speed shaft 122, the instability cannot be mitigated with the use of bearing dampers. When an engine is designed, the shaft speed expected to produce the highest deflection or instability at the midshaft is the shaft speed that equals the critical speed.

If the critical speed of the shaft critical speed falls within the standard operational range, i.e., if the critical speed is below the redline speed or the low-speed shaft 122 is a supercritical shaft, then during routine operation, the low-speed shaft 122 may at times operate at or pass through the critical speed, which induces an unstable condition. Even if the engine is operated at the critical speed temporarily, there is a possibility of undetected vibration, whirl instability, and some likelihood of damage. For low vibration and stability, it is preferable to have an operating range free of any intervening critical speeds.

There is a desire to pursue engines capable of operating at higher redline speeds. This pursuit of higher operating speeds requires that the low-speed shaft 122 have a higher strength to weight characteristic if it is also desired that the shaft remain subcritical. The inventors sought this end result—higher speed shafts while remaining subcritical. To this end, a large number of engine designs were evaluated. Depending on the architecture, the positions and numbers of bearings relative to mounting points 205a, 205b were varied, and the resulting impact, not only on the critical speed but also the feasibility of such configurations given competing requirements (clearance, spacing, sump locations, oil supply lines), were taken into consideration, as will be readily apparent in view of the disclosure. A discussion of these embodiments follows. In the following discussion, strength to weight ratio is represented as E/rho, calculated as the ratio of Young's modulus E for the material (expressed, for example, in pounds per square foot) divided by the density rho (expressed, for example, in pounds per cubic inch). The shaft bending mode is represented as the critical rotational speed expressed in rotations per minute (RPM), though it could alternatively be expressed as the fundamental frequency of the bending mode in Hertz.

In some embodiments, high strength steel alloys, advanced and/or composite materials were contemplated. For example, high strength-to-weight ratio materials such as titanium boride (TiB), a titanium metal matrix composite (TiMMC), provided 30% to 50% increased strength-to-weight ratio relative to steel or titanium alloys. In addition, coatings with materials such as graphene were found to improve strength by a factor of two in lab tests, without impacting weight. These types of changes in material composition may be characterized in some embodiments by the ratio of E/rho.

Figure 3B:
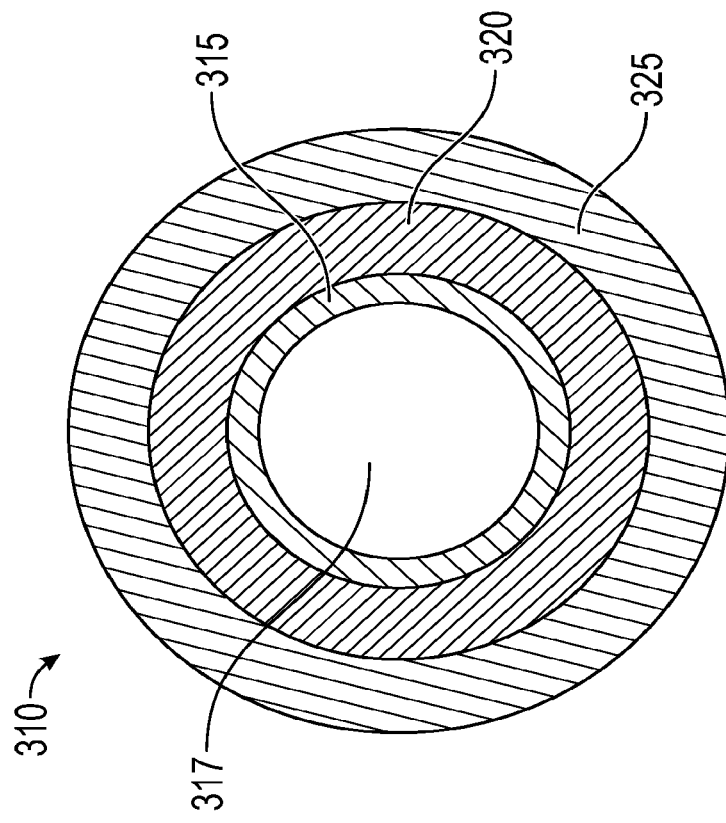
FIG. 3B shows a cross section of a composite shaft.
Figure 3A:
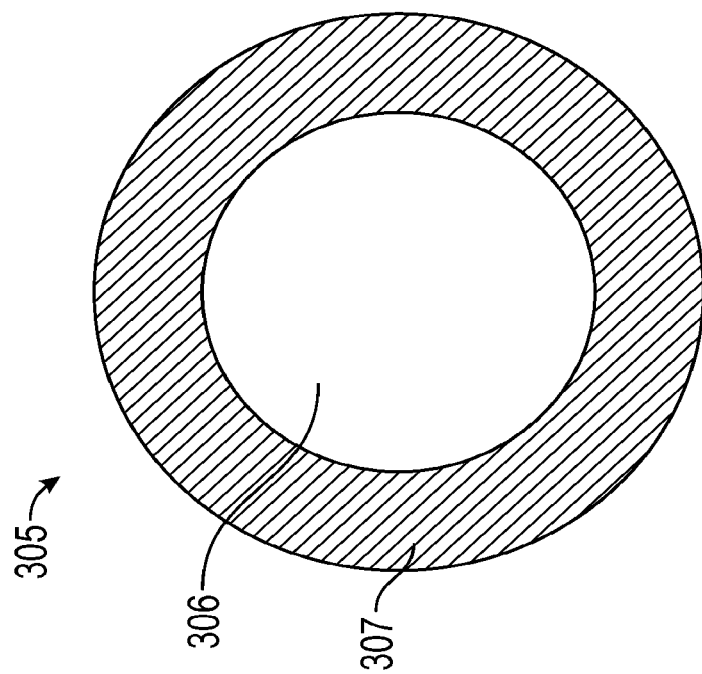
FIG. 3A shows a cross section of a steel shaft.

FIG. 3A shows a cross section of a steel shaft 305, with a standard hollow interior 306 surrounded by a steel layer 307, and geometry defined by a length L, outer diameter D, inner diameter d, etc.

FIG. 3B shows an example of a composite shaft 310, with identical geometry to the steel shaft 305. Rather than being composed entirely of steel, the composite shaft 310 has an inner layer 315 surrounding a hollow interior 317, a middle layer 320, and an outer coating 325, all of different materials. The middle layer 320 in this example is also steel, though in other embodiments the composite shaft could use no steel at all, or have a different layer be steel.

For example, both the steel shaft 305 and the composite shaft 310 have length L of seventy-six inches and outer diameter of three inches, along with a standard inbound two-bearings configuration as depicted in FIG. 2. The fundamental frequency of the unstable mode for the steel shaft 305 is eighty Hertz (Hz), whereas the fundamental frequency for the composite shaft 310 is ninety Hz.

In other embodiments, more layers or fewer layers may be used. Some or all of these layers and coatings may be of numerous alternative materials to steel, including but not limited to TiB, TiMMC, other metals and metal matrix composites, silicon carbide alloys, aluminum alloys, and/or graphene. The concepts of the present disclosure are not limited by the particular materials used for the layers and/or coatings. For the composite shaft 310, the critical speed corresponding to the unstable mode is increased relative to the (otherwise identical) steel shaft 305, which means that relative to the steel shaft 305, the composite shaft 310 can attain a higher rotational speed, before reaching the critical speed.

Depending on the type of composite materials chosen and the relative thickness and arrangement of the layers, the ratio of stiffness to weight can be modified, and, therefore the critical speed can be increased. The inventors conceived of a variety of embodiments resulting from the selection of different composite materials, thicknesses, and bearings configurations to allow for operation at higher speed. Two such embodiments are listed in TABLE 1. These embodiments were considered as possible designs that could increase the shaft stiffness to weight ratio in such a way to be compatible with engine architecture and without requiring modifications or limitations on the targeted operating range for a subcritical shaft.

TABLE 1

| Embodiment | L (in) | D (in) | Bearing type | E/rho (in$^{-1}$) | Teff (in) | Mode (RPM) |
| --- | --- | --- | --- | --- | --- | --- |
| 1 | 82.2 | 2.74 | 2-bearing outbound | 1.00E+08 | 0.35 | 4181 |
| 2 | 60.6 | 2.75 | inbound OTM | 1.27E+08 | 0.35 | 10263 |
| 3 | 82.2 | 2.74 | outbound OTM | 1.27E+08 | 0.35 | 6915 |

Embodiment 1 was evaluated using a high strength steel alloy and an outbound bearing layout. Embodiments 2 and 3 were evaluated with a composite material instead of steel alloy. Embodiment 2 uses overturning moment (OTM) bearings with an inbound bearing layout that is different from the layout used by Embodiment 1. Embodiment 3 uses OTM bearings with an outbound bearing layout that is similar to that used by Embodiment 1. These bearing types and layouts are described in further detail below with reference to FIG. 5A, 5B, and TABLE 3. The values shown in TABLE 1 illustrate that Embodiments 2 and 3 achieve a higher strength-to-weight ratio (E/rho) when using a composite material, instead of the steel alloy used in Embodiment 1. As a result of these differences, the shaft mode critical speed occurs at 4181 RPM for Embodiment 1, at 10263 RPM for Embodiment 2 and at 6915 for Embodiment 3.

The inventors also modified the shaft thickness along its length, to evaluate the effect on critical speed for a strength to weight ratio of E/rho that is not constant along the length L, and for different suitable materials. An example of a shaft with a uniform E/rho along its length L is shown in FIG. 4A, and examples of shafts having variable E/rho are shown in FIGS. 4B and 4C.

FIG. 4A conceptually shows a cross section of a uniform shaft 405 with a constant diameter and thickness. In this example, the uniform shaft 405 has a length L of seventy-six inches. The outer diameter D of the uniform shaft 405 is 3.0 inches. The uniform shaft 405 is hollow, with a constant wall thickness of 0.2 inches and corresponding constant inner radius of 1.3 inches along its length. For this example of a uniform shaft 405, and a two-bearing outbound configuration such as in FIG. 2, the fundamental frequency of the unstable mode is eighty Hz.

FIG. 4B conceptually shows a cross section of a concave shaft 410 with a constant outer diameter D and a variable thickness. For comparison, the uniform shaft 405 and the concave shaft 410 have the same material (e.g., hollow steel), bearings (outbound), and length (seventy-six inches), with a constant outer radius of 1.5 inches along its length. The outer diameter D of the concave shaft 410 is, therefore, 3.0 inches. Unlike the uniform shaft 405, however, the concave shaft 410 has a wall thickness of 0.3 inches at the ends 412, 414 (e.g., at the bearings, which are not shown in FIG. 4), and a thinner wall thickness of 0.15 inches in the midshaft region 415. This results in an inner radius of 1.35 inches in the midshaft region 415 and a smaller inner radius of 1.2 inches at the ends 412, 414. The concave shaft 410 therefore has a reduced mass density in the midshaft region 415. To achieve the resulting concave profile, various methods may be used to manufacture the concave shaft 410, such as a bottle boring technique.

FIG. 4C conceptually shows a cross section of a convex shaft 420 with a variable outer diameter D and a variable thickness. For comparison, the uniform shaft 405 and the convex shaft 420 have the same material (e.g., hollow steel), bearings (outbound), and length (seventy-six inches), with a constant inner radius of 1.2 inches along its length. Unlike the uniform shaft 405, the convex shaft 420 has a wall thickness of 0.3 inches at the ends 422, 424, and a thinner wall thickness of 0.15 inches in the midshaft region 425, just like the concave shaft 410. Unlike the concave shaft 410, the convex shaft 420 has an outer radius of 1.5 inches at the ends 422, 424, and a smaller outer radius of 1.35 inches in the midshaft region 425. The convex shaft 420 also has a reduced mass density in the midshaft region 425.

Since the radius (and, therefore, the diameter) are variable over the length of the convex shaft 420, the diameter D is defined in some embodiments as the diameter at the midshaft region 425, since this has the most relevance to the bending mode and undergoes maximum deflection. In the example of the convex shaft 420, the shaft outer diameter D is 2.7 inches in the midshaft region 425. In other embodiments, for example, embodiments when the radius has multiple minima and/or maxima, the diameter D may be defined at any of those minima or maxima. To achieve the resulting convex profile, various methods may be used to manufacture the convex shaft 420, such as external machining.

For both convex and concave thickness profiles, as well as types of variable thickness profiles, the thickness may be described using an effective thickness value, $T_{eff}$. For a uniform shaft the thickness would simply be the difference between the outer diameter and the inner diameter. When these values are variable over the length of the shaft, the effective thickness is calculated as the difference between the effective outer diameter and effective inner diameter. For example, the effective thickness may be defined at the midshaft.

With variable thickness, in some embodiments the concave shaft 410 and the convex shaft 420 can have twenty-five to thirty percent less weight than the uniform shaft 405 in the midshaft region 415 and 425, respectively. Note that the variation in thickness need not be continuous, for example a stepped change in geometry could also be used. As a result, the fundamental frequency of the unstable mode for both the concave shaft 410 and the convex shaft 420 is increased to ninety Hz, which is higher than the eighty Hz fundamental frequency for the uniform shaft 405. In other words, the concave shaft 410 and the convex shaft 420 can both attain a higher rotational speed than that of uniform shaft 405, before reaching subcritical speeds.

The concave shaft 410 and the convex shaft 420 are examples of different thickness profiles that may be used in some embodiments. Other thickness profiles are also contemplated, which reduce or increase the mass density of the shaft in the midshaft region. The concepts of the current disclosure are not limited by the particular thickness profile used.

Depending on the thickness profile, the ratio of stiffness to weight can be modified to produce significant changes in the critical speed. Exemplary embodiments are listed in TABLE 2. These embodiments were considered as possible designs that could modify the effective thickness in such a way to be compatible with engine architecture and without requiring modifications or limitations on the targeted operating range for a subcritical shaft.

TABLE 2

| Embodiment | L (in) | D (in) | Bearing type | E/rho (in$^{-1}$) | Teff (in) | Mode (RPM) |
|---|---|---|---|---|---|---|
| 4 | 60.6 | 2.75 | inbound OTM | 1.00E+08 | 0.35 | 9001 |
| 5 | 82.2 | 2.74 | outbound OTM | 1.00E+08 | 0.35 | 6065 |
| 6 | 60.6 | 2.75 | inbound OTM | 1.00E+08 | 0.32 | 10039 |
| 7 | 82.2 | 2.74 | outbound OTM | 1.00E+08 | 0.32 | 6942 |

Embodiments 4, 5, 6, and 7 all use a steel alloy material composition. Embodiments 4 and 6 use an inbound bearing layout with OTM bearings, and Embodiments 5 and 7 use an outbound bearing layout with OTM bearings. Embodiments 4 and 5 are uniform shafts similar to the Example of FIG. 4A. Embodiments 6 and 7, however, have a convex thickness profile similar to the example of FIG. 4C, having been manufactured with a bottle boring manufacturing technique. The values shown in TABLE 2 illustrate that Embodiments 6 and 7 achieve a lower effective thickness $T_{eff}$ due to their convex profile, instead of the uniform profile for Embodiments 4 and 5. As a result of these differences, the shaft mode critical speed occurs at 9001 RPM for Embodiment 4, and at 10039 RPM for Embodiment 6. The shaft mode critical speed occurs at 6065 RPM for Embodiment 5, and at 6942 RPM for Embodiment 7.

The inventors also conceived of a variety of shafts with modified bearing configurations. Bearings are used to provide transverse support to the shaft along its length. Bearings may be ball-type bearings, which have a very small contact area with the shaft to provide less friction, or roller-type bearings, which have a large contact area with the shaft to provide increased rigidity and load bearing. Different types of bearings may be mixed in various bearing layouts. According to additional embodiments, different bearing layouts were considered, for different combinations of uniform, convex, and concave shafts, or varying shaft thickness profiles and material composition in order to determine which combination would work best for a given architecture and need, as well as taking into account competing engineering requirements.

A variety of combinations of bearing configurations were contemplated, such as embodiments when the number of bearings in duplex and/or straddling position relative to engine components (e.g., a booster 521 or a low-pressure turbine 520) were changed. Either or both of the engine components mounted to the shaft 522 may be straddled or overhung. It was found that these variations can improve the critical speed and/or be more suitable to accommodate space limitations, lubrication resources or other architecture-imposed limitations. The embodiments included locating bearings at different inbound or outbound positions relative to the mounting points 505a, 505b.

Specific bearing layouts were preferentially used in various embodiments. These are now described in more detail, though the concepts of the present disclosure are not limited by the particular number or arrangement of bearings described herein.

For example, FIG. 5A conceptually shows a low-pressure turbine 520 and a booster 521 mounted on a shaft 522 supported by a four-bearing straddle configuration. Additional bearings located around the circumference of the shaft 522 are omitted from FIG. 5A for clarity. In this system, one pair of bearings 523a, 524a straddle (i.e., placed forward and aft of) a mounting point 505a of the booster 521, and a second pair of bearings 523b, 524b straddle a mounting point 505b of the low-pressure turbine 520. In this example, bearings 524a, 523b, and 524b are roller bearings, and bearing 523a is a ball bearing, though these bearing types may vary. The length L for shaft 522 is represented in some embodiments as the distance between the midpoints or centers of the innermost bearings 524a, 523b. The four-bearing straddle layout is used in several embodiments described with reference to TABLE 3.

As another example, FIG. 5B conceptually shows a low-pressure turbine 520 and a booster 521 mounted on a shaft 522 supported by a four-bearing outbound configuration. Additional bearings located around the circumference of the shaft 522 are omitted from FIG. 5B for clarity. This system is similar to that of the straddle system shown in FIG. 5A, but differs in that bearings 523a, 524a are both placed forward of mounting point 505a of the booster 521, and bearings 523b, 524b are placed aft of mounting point 505b of the low-pressure turbine 520. The shaft 522 may extend beyond bearings 523b, 524b. As in the example of FIG. 5A, bearings 524a, 523b, and 524b are roller bearings, and bearing 523a is a ball bearing, though these bearing types may vary. The length L for shaft 522 is represented in some embodiments as the distance between the midpoints or centers of the innermost bearings 524a, 523b.

As yet another example, FIG. 5C conceptually shows a shaft 522 with an inbound duplex bearing configuration. Additional bearings located around the circumference of the shaft 522 are omitted from FIG. 5C for clarity. According to some embodiments, a first pair of ball bearings 525a, 526a is arranged in a duplex configuration aft of the mounting point 505a for the booster 521. A second pair of ball bearings 525b, 526b is arranged in a duplex configuration forward of the mounting point 505b for the low-pressure turbine 520. Duplex bearing arrangements may also be referred to as double-row bearings, or overturning moment (OTM) bearings, since they provide moment stiffness to the shaft, i.e., provide resistance to rotation across the bearing locations. In some embodiments duplex bearing types may include tandem bearings, back-to-back bearings, face-to-face bearings, and/or tapered roller bearings.

In the example shown in FIG. 5C, both the first pair of ball bearings 525a, 526a and the second pair of ball bearings 525b, 526b are in an inbound position, i.e., located closer towards the midshaft 527 than the respective mounting points 505a, 505b. In this position, the booster 521 and the low-pressure turbine 520 are referred to as overhung. This inbound OTM layout is used in Embodiments 2, 4, and 6, for example, described above with reference to TABLES 1 and 2.

Alternatively, the first pair of ball bearings 525a, 526a and/or the second pair of ball bearings 525b, 526b may be in an outbound position, as shown in FIG. 5D, i.e., located farther from the midshaft 527 than the respective mounting points 505a, 505b of the booster 521 and the low-pressure turbine 520. The length L for the duplex bearing configurations shown in FIGS. 5C and 5D may be represented in some embodiments as the distance between the midpoints or centers of the innermost ball bearings 526a and 525b, or alternatively, as the distance between the center of the first pair of ball bearings 525a, 526a and the center of the second pair of ball bearings 525b, 526b. The outbound OTM layout is used in Embodiments 3, 5, and 7, for example, described above with reference to TABLES 1 and 2.

Figure 5E:
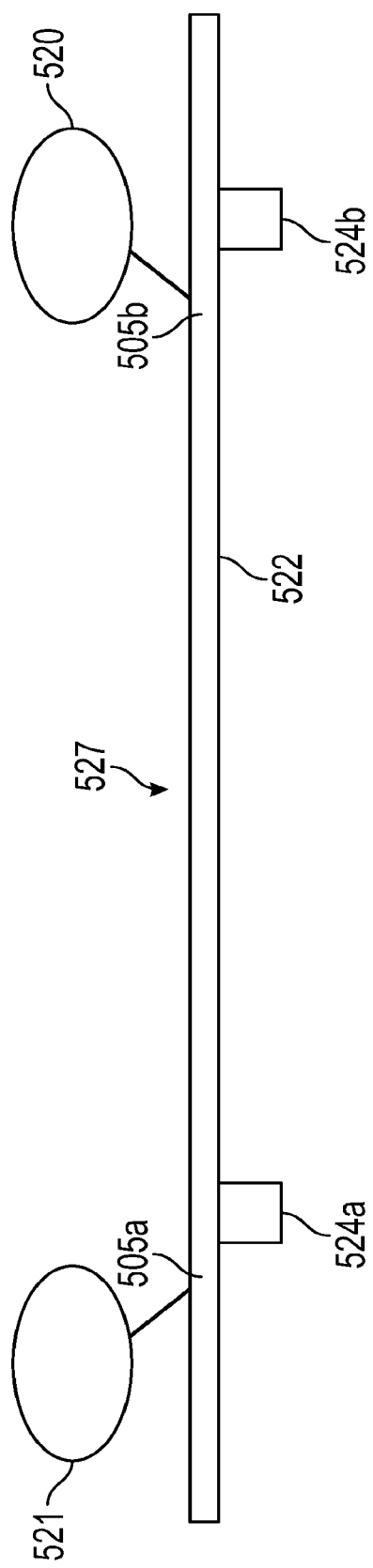
FIG. 5E shows a shaft using a two-bearing configuration.

As a further example, FIG. 5E conceptually shows a shaft 522 with a two-bearing configuration. This configuration employs a first roller bearing 524a positioned aft of the mounting point 505a for the booster 521, and a second roller bearing 524b positioned aft of the mounting point 505b for the low-pressure turbine 520. The length L for this two-bearing configuration is represented in some embodiments as the distance between the midpoints or centers of the roller bearings 524a, 524b. Alternative two-bearing configurations may position the two bearings in either an outbound configuration or an inbound configuration. An example of a two-bearing layout in an inbound configuration is shown in FIG. 1, that shows bearings 123a, 123b, 123c, and 123d are all located inbound of the mounting points for the booster 121 and the low-pressure turbine 120. Note that in this context, two is the number of bearings along the shaft 522, and does not include additional bearings along the circumference of the shaft 522. Embodiment 1, described above with reference to TABLE 1, uses a two-bearing layout in an outbound configuration (not shown).

In FIGS. 5A to 5E, the lines connecting the booster 521 to mounting point 505a and low-pressure turbine 520 to mounting point 505b are intended only to indicate schematically the general location of a net force of the engine core components (e.g., booster 521 or low-pressure turbine 520) acting on the shaft 522 relative to the bearings, and is illustrated in this fashion only for purposes of illustrating a relationship between the nearest engine component relative to the bearing(s). It will be understood that the actual loading on a shaft is distributed and comes from not only the engine components represented by booster 521 and low-pressure turbine 520, but other nearby structures as well. The primary loading for purposes of this disclosure may, however, be thought of simply in terms of engine components attached to the shaft 522 (e.g., low-pressure turbine 520 and booster 521). It will be understood that the representation shown in FIGS. 5A to 5E is sufficient in defining the parts of the turbomachine that mostly influence the shaft 522 behavior.

As discussed, at least one bearing may have an overturning moment (OTM) capability, which can resist relative rotation across the bearing in at least a lateral plane or a vertical plane. These relative rotations may occur during bending of the shaft. The position along the shaft of such bearings with OTM capabilities may directly affect the critical speed, by providing constraints to the relative rotations of the shaft, in addition to the transverse support function of the bearings.

Examples of embodiments with different bearing arrangements are summarized in TABLE 3. Generally, the inventors found that the number of bearings, the position of the bearings and the OTM capability of the bearings can be selected to make a full range of operations subcritical for an engine. In other words, the selection of bearing layout can affect (either increase or decrease) the shaft's critical speed.

TABLE 3

| Embodiment | L (in) | D (in) | Bearing type | E/rho (in$^{-1}$) | Teff (in) | Mode (RPM) |
|---|---|---|---|---|---|---|
| 8 | 60.6 | 2.75 | 4-bearing straddle | 1.00E+08 | 0.35 | 7746 |
| 9 | 60.6 | 2.75 | 4-bearing straddle | 1.00E+08 | 0.32 | 8555 |
| 10 | 60.6 | 2.75 | 4-bearing straddle | 1.27E+08 | 0.35 | 8832 |
| 11 | 82.2 | 2.74 | 4-bearing straddle | 1.27E+08 | 0.32 | 9703 |
| 12 | 60.6 | 2.75 | inbound OTM | 1.27E+08 | 0.32 | 11386 |
| 13 | 82.2 | 2.74 | outbound OTM | 1.27E+08 | 0.32 | 7873 |

Embodiments 8, 9, 10, and 11 use a four-bearing straddle layout. Embodiments 8 and 9 use steel alloy, while Embodiments 10 and 11 use composite materials. Embodiments 8 and 10 have a uniform thickness profile, while Embodiments 9 and 11 have a concave thickness profile, manufactured using a bottle boring method. As a result of these differences, the shaft mode critical speed occurs at 7746 RPM for Embodiment 8, 8555 RPM for Embodiment 9, 8832 RPM for Embodiment 10, and 9703 RPM for Embodiment 11.

Embodiments 11, 12, and 13 all use composite material and concave thickness profile via bottle boring. However, Embodiment 11 uses a four-bearing straddle layout, Embodiment 12 uses an inbound OTM bearing layout, and Embodiment 13 uses an outbound OTM bearing layout. As a result of these differences, the shaft mode critical speed occurs at 9703 RPM for Embodiment 11, 11386 RPM for Embodiment 12, and 7873 RPM for Embodiment 13.

Embodiment 11 can also be compared to Embodiments 8, 9, and 10 as described with reference to TABLE 3. This allows a comparison of the impact on critical speed of using composite material, variable thickness profile, and both, on a shaft with a four-bearing straddle layout.

Embodiment 12 can be compared to Embodiments 2, 4, and 6 described with reference to TABLE 2. This allows a comparison of the impact on critical speed of using composite material, variable thickness profile, and both, on a shaft with an inbound OTM layout.

Embodiment 13 can be compared to Embodiments 3, 5, and 7 described with reference to TABLE 2. This allows a comparison of the impact on critical speed of using composite material, variable thickness profile, and both, on a shaft with an outbound OTM layout.

Additionally, Embodiments 2 and 3 (in TABLE 1), and 10 (in TABLE 3) can be compared, to evaluate the impact on critical speed of using different bearing layouts on shafts using composite material. Embodiments 6 and 7 (in TABLE 2) and 9 (in TABLE 3) can be compared, to evaluate the impact on critical speed of using different bearing layouts on shafts using concave thickness profiles.

The embodiments of turbomachine engines, and in particular the shafts associated with a power turbine described with reference to FIGS. 3A, 3B, 4A to 4C, 5A, and 5B, were found to provide an improvement in the performance of a shaft vis-à-vis its operating range. In addition to the mentioned embodiments and those provided in TABLES 1 to 3, the types of improvements to the critical speed of the shaft when these features were combined, taking into consideration the various benefits, as well as down-sides, to selecting a particular configuration for a turbomachine architecture.

Examples of a subcritical shaft with a high redline speed include a shaft with a redline speed of, e.g., 70 ft/sec and adapted for a shaft mode of 5293 RPM, a shaft with a redline speed of, e.g., 75 ft/sec and adapted for a shaft mode of 6380 RPM, and a shaft with a redline speed of, e.g., 181 ft/sec and adapted for a shaft mode of 11410 RPM.

As indicated earlier, a selection of power turbine shaft and bearing arrangement, and location of those bearings for a turbomachine takes into consideration other factors, some of which can limit the selection of a shaft. The inventors however realized during the course of making the several embodiments referred to in the foregoing that there is a particular range of designs, constraints on feasible designs that provided an unexpected benefit. The interplay between components can make it particularly difficult to select or develop one component during engine design and prototype testing, especially when some components are at different stages of completion. For example, one or more components may be nearly complete, yet one or more other components may be in an initial or preliminary phase where only one (or a few) design parameters are known. It is desired to arrive at what is possible at an early stage of design, so that the down selection of candidate optimal designs, given the tradeoffs, become more possible. Heretofore the process has sometimes been more ad hoc, selecting one design or another without knowing the impact when a concept is first taken into consideration.

Even taken separately from the integration of a shaft design with the rest of an engine, modifying an existing shaft to increase its critical speed is challenging, and the impact of the different types of improvements and configurations on critical speed is not easily predictable without empirical experimentation and simulation, which can be enormously expensive and time-consuming. In some cases, a modification may even result in lowering the critical speed.

It is desirable to narrow the range of configurations or combination of features that can yield favorable results given the constraints of the design, feasibility, manufacturing, certification requirements, etc. early in the design selection process to avoid wasted time and effort. During the course of the evaluation of different embodiments as set forth above, the inventors discovered, unexpectedly, that there exists a relationship between the critical speed of the shaft and the ratio L/D, which uniquely identifies a finite and readily ascertainable (in view of this disclosure) number of embodiments suitable for a particular architecture that can avoid a supercritical or critical shaft situation during normal operation of an engine. This relationship is referred to by the inventors as the midshaft rating (MSR), and is calculated according to the following relationship (1) between length, diameter and a redline speed (ft/sec) measured at the outer diameter of the shaft:

$$\text{Midshaft Rating MSR} = (L/D)(\text{Shaft OD Speed at redline})^{1/2} \qquad (1)$$

L/D is shaft length divided by effective shaft outer diameter, L/D. The ratio L/D is multiplied with the square root of the outer diameter (OD) rotation speed (OD Speed) at the redline speed for the engine architecture. Generally, the length L and diameter D are expressed in inches, and the shaft OD redline speed is the linear speed of the shaft surface. The OD redline speed in feet per second is calculated as the shaft mode speed (in RPM) multiplied by the outer circumference of the shaft (the outer diameter of the shaft multiplied by pi), and with additional corrections to convert from inches to feet and from minutes to seconds. Accordingly, the midshaft rating has units of $(\text{velocity})^{1/2}$.

The midshaft rating identifies embodiments for a turbomachine's power turbine that allow subcritical operation of the engine for a rated redline speed. TABLE 4 lists exemplary embodiments of the turbine shaft along with its associated MSR value. The embodiments can inform one of the dimensions or qualities of the shaft that are believed reasonable and practical for a shaft according to its basic features and the intended, rated critical speed. In other words, the midshaft rating, and, optionally, the L/D ratio and/or the OD speed at redline, indicates the operating ranges of interest, taking into account the constraints within which a turbomachine operates, e.g., size, dimensions, cost, mission requirements, airframe type, etc.

In other embodiments, the midshaft rating may also, or alternatively, be used to define the propulsive system operating at a relatively high redline speed. Such things as the requirements of a propulsive system, the requirements of its subsystem(s), airframe integration needs and limitations, and performance capabilities may, therefore, be summarized or defined by the midshaft rating.

In still other embodiments, the midshaft rating may additionally provide a particularly useful indication of the efficiency and effectiveness of the engine during initial development, e.g. as a tool to accept or reject a particular configuration. Thus, the midshaft rating can be used, for example, to guide low-speed shaft development. Therefore, the midshaft rating can also improve the process of developing a turbomachine engine.

Table 4 lists the bearing layout, the strength-to-weight ratio E/rho in inches$^{-1}$, the effective thickness $T_{eff}$ in inches, the critical speed corresponding to the shaft's fundamental mode in RPM, the OD linear speed at redline in ft/sec, the length-to-diameter ratio L/D (dimensionless), and MSR in $(\text{ft/sec})^{1/2}$ for all the embodiments (1 to 13) of Tables 1 to 13, as well as a number of additional embodiments (14 to 34). As noted above, L/D represents the ratio of the length over the outer diameter. When the shaft has a variable diameter over its length, the outer diameter may be the diameter at the midshaft. E/rho represents the material composition of the shaft, and $T_{eff}$ represents an effective wall thickness of the shaft. For shafts with variable thickness over their length, the wall thickness may be the thickness at the midshaft.

TABLE 4

| Embodiment | Bearing Layout | E/rho in$^{-1}$ | Teff in | Mode RPM | L/D | OD Speed ft/sec | MSR (ft/sec)$^{1/2}$ |
|---|---|---|---|---|---|---|---|
| 1 | 2-bearing outbound | 1.00E+8 | 0.35 | 4181 | 30 | 50 | 214 |
| 2 | inbound OTM | 1.27E+8 | 0.35 | 10263 | 22 | 123 | 247 |

TABLE 4-continued

| Embodiment | Bearing Layout | E/rho in$^{-1}$ | Teff in | Mode RPM | L/D | OD Speed ft/sec | MSR (ft/sec)$^{1/2}$ |
|---|---|---|---|---|---|---|---|
| 3 | outbound OTM | 1.27E+8 | 0.35 | 6915 | 30 | 83 | 275 |
| 4 | inbound OTM | 1.00E+8 | 0.35 | 9001 | 22 | 108 | 231 |
| 5 | outbound OTM | 1.00E+8 | 0.35 | 6065 | 30 | 73 | 257 |
| 6 | inbound OTM | 1.00E+8 | 0.32 | 10039 | 22 | 121 | 242 |
| 7 | outbound OTM | 1.00E+8 | 0.32 | 6942 | 30 | 83 | 272 |
| 8 | 4-bearing straddle | 1.00E+8 | 0.35 | 7746 | 22 | 93 | 214 |
| 9 | 4-bearing straddle | 1.00E+8 | 0.32 | 8555 | 22 | 103 | 223 |
| 10 | 4-bearing straddle | 1.27E+8 | 0.35 | 8832 | 22 | 106 | 229 |
| 11 | 4-bearing straddle | 1.27E+8 | 0.32 | 9703 | 30 | 116 | 322 |
| 12 | inbound OTM | 1.27E+8 | 0.32 | 11386 | 22 | 137 | 257 |
| 13 | outbound OTM | 1.27E+8 | 0.32 | 7873 | 30 | 94 | 290 |
| 14 | 4-bearing outbound | 1.00E+8 | 0.35 | 6262 | 26 | 72 | 219 |
| 15 | 2-bearing aft | 1.27E+8 | 0.29 | 8255 | 21 | 109 | 215 |
| 16 | 2-bearing aft | 1.27E+8 | 0.31 | 13323 | 14 | 233 | 216 |
| 17 | 2-bearing aft | 1.27E+8 | 0.47 | 5667 | 23 | 83 | 210 |
| 18 | 2-bearing aft | 1.27E+8 | 0.29 | 6380 | 24 | 83 | 215 |
| 19 | 2-bearing aft | 1.27E+8 | 0.31 | 9821 | 17 | 154 | 216 |
| 20 | 2-bearing aft | 1.27E+8 | 0.47 | 4586 | 26 | 67 | 211 |
| 21 | 2-bearing aft | 1.00E+8 | 0.23 | 6380 | 24 | 84 | 217 |
| 22 | 2-bearing aft | 1.00E+8 | 0.25 | 13493 | 14 | 235 | 218 |
| 23 | 2-bearing aft | 1.00E+8 | 0.38 | 4586 | 27 | 62 | 210 |
| 24 | 2-bearing aft | 1.27E+8 | 0.29 | 6619 | 25 | 87 | 231 |
| 25 | 2-bearing aft | 1.27E+8 | 0.31 | 11065 | 17 | 176 | 232 |
| 26 | 2-bearing aft | 1.27E+8 | 0.47 | 4852 | 28 | 64 | 224 |
| 27 | 4-bearing straddle | 1.00E+8 | 0.29 | 6380 | 28 | 75 | 245 |
| 28 | inbound OTM | 1.00E+8 | 0.31 | 10666 | 19 | 165 | 247 |
| 29 | outbound OTM | 1.00E+8 | 0.47 | 4586 | 31 | 59 | 239 |
| 30 | 4-bearing straddle | 1.27E+8 | 0.23 | 6380 | 35 | 70 | 289 |
| 31 | inbound OTM | 1.27E+8 | 0.25 | 11410 | 22 | 181 | 294 |
| 32 | outbound OTM | 1.27E+8 | 0.38 | 5293 | 33 | 70 | 276 |

Embodiments 15 to 26 use a two-bearing aft layout. These embodiments differ in using composite materials, different shaft geometries, and variable thickness profiles.

Embodiments 15 to 17 use a composite material instead of steel alloy. These embodiments differ in shaft geometry, with different L/D ratios ranging from 14 to 23.

Embodiments 18 to 20 use a material composite instead of a steel alloy. These embodiments also differ from each other in shaft geometry (e.g., L/D ratio). These also differ from Embodiments 15 to 17, in being longer and thinner, resulting in a higher range of L/D ratio, from 17 to 26.

Embodiments 21 to 23 use a steel alloy, vary the shaft geometry (length and/or diameter), and have a concave thickness profile. These differ from each other in terms of their effective thickness. These embodiments may be compared to Embodiments 24 to 26, which use composite materials, vary the shaft geometry (length and/or diameter), and have a concave thickness profile.

Embodiments 27 to 32 use different bearing layouts. Embodiments 27 to 29 use steel alloy and have varying geometry. Embodiments 30 to 32 use material composites and a concave thickness profile, in addition to varying geometry.

Based on the experimentation described above, the inventors identified embodiments with MSR between two hundred and three hundred (ft/sec)$^{-1}$ and OD redline speeds ranging from fifty to two hundred fifty ft/sec and with L/D ratio ranging from twelve to thirty-seven were possible and indicated noticeable improvements in subcritical range when the power turbine shaft incorporates the various aspects of the disclosure.

Figure 6A:
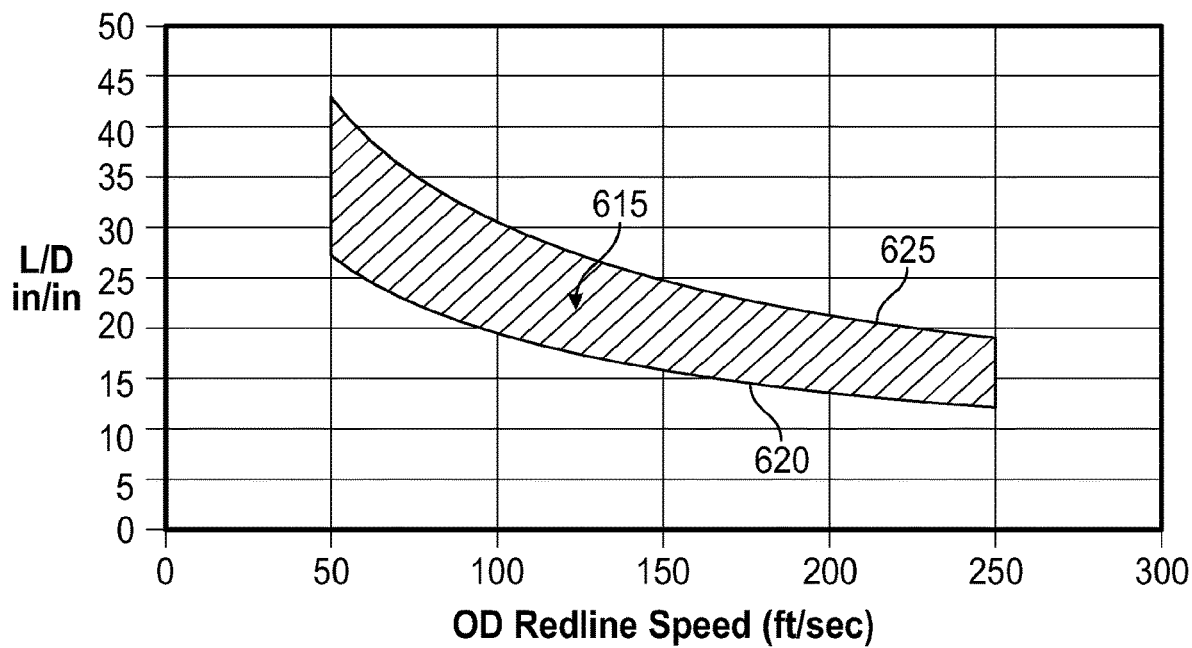
FIG. 6A shows a plot depicting an exemplary range of a midshaft rating relative to an exemplary range of outer diameter redline speeds.

FIG. 6A illustrates exemplary ranges and/or values for a midshaft rating, with respect to OD speed at redline. The plot indicates exemplary values for the midshaft rating (MSR). Specifically, FIG. 6A shows a range 615 defined by MSR between 200 (ft/sec)$^{-1}$ (curve 620) and 300 (ft/sec)$^{-1}$ (curve 625), for redline speeds from fifty to two hundred and fifty feet per second.

Figure 6B:
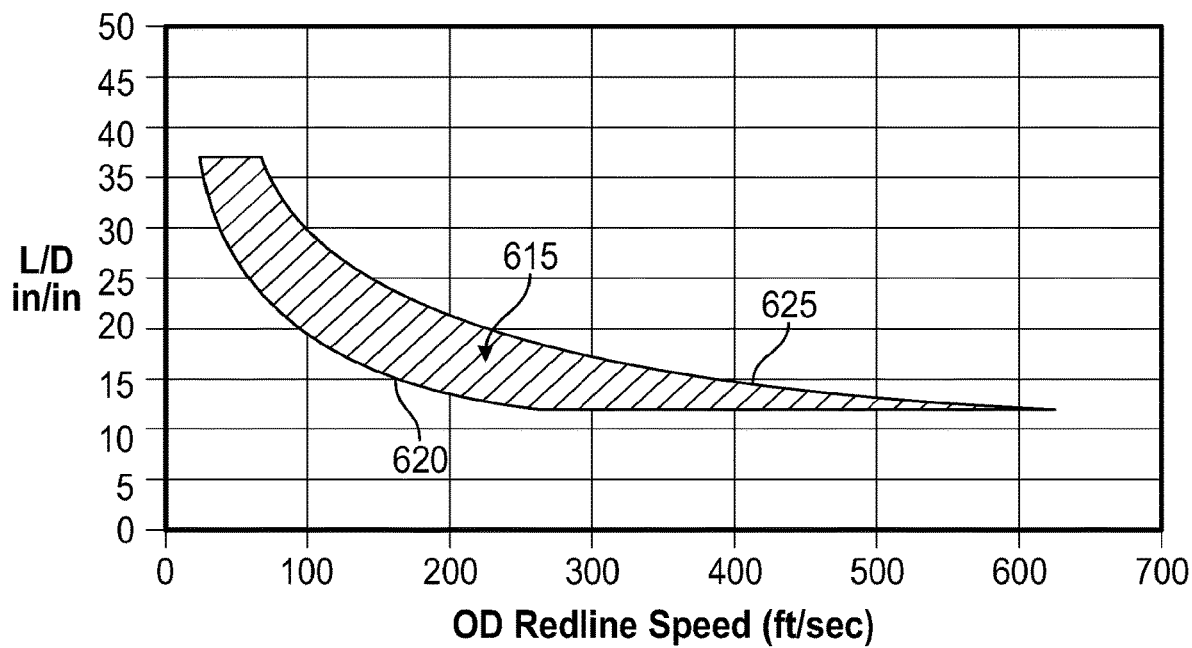
FIG. 6B shows a plot depicting an exemplary range of a midshaft rating relative to an exemplary range of length-diameter ratio.

FIG. 6B illustrates exemplary ranges and/or values for a midshaft rating, with respect to L/D ratio. The plot indicates exemplary values for the midshaft rating (MSR). Specifically, FIG. 6B shows a range 615 defined by MSR between 200 (ft/sec)$^{-1}$ (curve 620) and 300 (ft/sec)$^{-1}$ (curve 625), for L/D ratios from twelve to thirty-seven.

Table 5 summarizes examples of different operating ranges for embodiments, such as the embodiments listed in Table 4. For example, an embodiment can be configured with a L/D ranging between twelve and twenty may have an OD speed between one hundred and fifty and two hundred and fifty ft/sec, and a corresponding range of MSR between one hundred ninety and two hundred forty-five (ft/sec)$^{1/2}$. As another example, an embodiment can be configured with a L/D ranging between sixteen and thirty may have an OD speed between seventy-five and one hundred seventy-five ft/sec, and a corresponding range of MSR between two hundred twelve and two hundred sixty (ft/sec)$^{1/2}$. As still another example, an embodiment can be configured with a L/D ranging between twenty-six and thirty-seven may have an OD speed between sixty and ninety ft/sec, and a corresponding range of MSR between two hundred forty-seven and two hundred eighty-seven ft/sec)$^{1/2}$. These low, nominal, and high ranges as summarized in Table 5 are general examples, and individual embodiments may exceed these values.

TABLE 5

| Example Limits and Ranges | L/D (in/in) | OD Speed (ft/sec) | MSR (ft/sec)$^{1/2}$ |
|---|---|---|---|
| Low limit | 12 | 250 | 190 |
| | 20 | 150 | 245 |

TABLE 5-continued

| Example Limits and Ranges | L/D (in/in) | OD Speed (ft/sec) | MSR (ft/sec)$^{1/2}$ |
|---|---|---|---|
| Nominal limit | 16 | 175 | 212 |
|  | 30 | 75 | 260 |
| High Limit | 26 | 90 | 247 |
|  | 37 | 60 | 287 |

In view of the foregoing objectives, in at least certain embodiments, a propulsion system is configured to define an MSR greater than one hundred ninety (ft/sec)$^{1/2}$, such as greater than two hundred (ft/sec)$^{1/2}$, such as at least two hundred thirty-five (ft/sec)$^{1/2}$, up to at least three hundred (ft/sec)$^{1/2}$.

In view of the foregoing objectives, in at least certain embodiments, a propulsion system is configured to define an L/D ratio greater than twelve, such as greater than sixteen, such as at least twenty-six, up to at least thirty-seven.

In view of the foregoing objectives, in at least certain embodiments, a propulsion system is configured to define an OD redline speed greater than sixty ft/sec, such as greater than seventy five ft/sec, such as at least one hundred and fifty ft/sec, up to at least two hundred and fifty ft/sec.

Based on the teachings in this disclosure, and without limiting the disclosure to only those embodiments explicitly shown, it will be understood how both the manner and the degree to which a modification of shaft length, diameter, material composition, bearings configuration, and thickness profile affects the MSR, and, additionally, the competing requirements, or requirements for a turbomachine architecture (e.g., available spacing/packaging, clearance, sump location, lubrication, etc.) for a given MSR.

Further aspects of the present disclosure are provided by the subject matter of the following clauses.

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred (ft/sec)$^{1/2}$ and three hundred (ft/sec)$^{1/2}$, and a redline speed between fifty and two hundred fifty feet per second (ft/sec).

A turbomachine engine includes a core engine having one or more compressor sections, one or more turbine sections that includes a power turbine, and a combustion chamber in flow communication with the compressor sections and turbine sections. The turbomachine engine also includes a shaft that is coupled to the power turbine and that is characterized by a midshaft rating (MSR) between two hundred (ft/sec)$^{1/2}$ and three hundred (ft/sec)$^{1/2}$, a length L, an outer diameter D, and a ratio of L/D between twelve and thirty-seven.

The turbomachine engine of any preceding clause, wherein the turbomachine engine is configured to operate up to a redline speed without passing through a critical speed associated with a first-order bending mode of the shaft.

The turbomachine engine of any preceding clause, wherein the turbomachine engine is configured to operate up to the redline speed without passing through a critical speed associated with a first-order bending mode of the shaft.

The turbomachine engine of any preceding clause, wherein the MSR is between one hundred ninety (ft/sec)$^{1/2}$ and two hundred forty-five (ft/sec)$^{1/2}$.

The turbomachine engine of any preceding clause, wherein the MSR is between two hundred twelve (ft/sec)$^{1/2}$ and two hundred sixty (ft/sec)$^{1/2}$.

The turbomachine engine of any preceding clause, wherein the MSR is between two hundred forty-seven (ft/sec)$^{1/2}$ and two hundred ninety (ft/sec)$^{1/2}$.

The turbomachine engine of any preceding clause, wherein the redline speed is between sixty and ninety ft/sec.

The turbomachine engine of any preceding clause, wherein the redline speed is between seventy-five and one hundred seventy-five ft/sec.

The turbomachine engine of any preceding clause, wherein the redline speed is between one hundred fifty and two hundred fifty ft/sec.

The turbomachine engine of any preceding clause, wherein the ratio of L/D is between twelve and twenty.

The turbomachine engine of any preceding clause, wherein the ratio of L/D is between sixteen and thirty.

The turbomachine engine of any preceding clause, wherein the ratio of L/D is between twenty-six and thirty-seven.

The turbomachine engine of any preceding clause, wherein the shaft is a composite shaft made of at least two different materials.

The turbomachine engine of any preceding clause, wherein the shaft has a length L and a reduced mass density at a midpoint along the length L.

The turbomachine engine of any preceding clause, wherein the shaft has a reduced mass density at a midpoint along the length L.

The turbomachine engine of any preceding clause, wherein the shaft is a hollow convex shaft with a reduced wall thickness at the midpoint, a variable inner diameter, and a constant outer diameter.

The turbomachine engine of any preceding clause, wherein the shaft is a hollow convex shaft with a reduced wall thickness at the midpoint, a constant inner diameter, and a variable outer diameter.

The turbomachine engine of any preceding clause, wherein the shaft is coupled to the power turbine at a first mounting point, and wherein the shaft is also coupled to one of the compressor sections at a second mounting point.

The turbomachine engine of any preceding clause, wherein the shaft is supported by at least a first bearing and a second bearing.

The turbomachine engine of any preceding clause, wherein the shaft has a length L that is measured as the distance between the first bearing and the second bearing.

The turbomachine engine of any preceding clause, wherein the length L is measured as the distance between the first bearing and the second bearing.

The turbomachine engine of any preceding clause, wherein at least one bearing is a duplex bearing that has an overturning moment capability.

The turbomachine engine of any preceding clause, wherein each bearing is one of a ball bearing and a roller bearing.

The turbomachine engine of any preceding clause, wherein the first bearing is positioned between the first mounting point and the second mounting point, and wherein the second mounting point is positioned between the first bearing and the second bearing.

The turbomachine engine of any preceding clause, wherein the first bearing and the second bearing support the shaft in an inbound configuration in which the first bearing and the second bearing are positioned between the first mounting point and the second mounting point.

The turbomachine engine of any preceding clause, wherein the first bearing and the second bearing support the shaft in an outbound configuration in which the first mounting point and the second mounting point are positioned between the first bearing and the second bearing.

The turbomachine engine of any preceding clause, wherein the shaft is further supported by a third bearing and a fourth bearing.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The turbomachine engine of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The turbomachine engine of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The turbomachine engine of any preceding clause, wherein the first bearing, the second bearing, the third bearing, and the fourth bearing support the shaft in a four-bearing outbound configuration in which the first mounting point and the second mounting point are positioned between a first group of bearings comprising the first bearing and the second bearing, and a second group of bearings comprising the third bearing and the fourth bearing.

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, and a redline speed between fifty and two hundred fifty feet per second (ft/sec).

In another aspect, a method includes using a turbomachine engine with a core having one or more compressor sections, one or more turbine sections that includes a power turbine, and a combustion chamber in flow communication with the compressor sections and turbine sections. The method also includes driving a shaft that is coupled to the power turbine and that is characterized by a midshaft rating (MSR) between two hundred $(ft/sec)^{1/2}$ and three hundred $(ft/sec)^{1/2}$, a length L, an outer diameter D, and a ratio of L/D between twelve and thirty-seven.

The method of any preceding clause, wherein the turbomachine engine is configured to operate up to a redline speed without passing through a critical speed associated with a first-order bending mode of the shaft.

The method of any preceding clause, wherein the turbomachine engine is configured to operate up to the redline speed without passing through a critical speed associated with a first-order bending mode of the shaft.

The method of any preceding clause, wherein the MSR is between one hundred ninety $(ft/sec)^{1/2}$ and two hundred forty-five $(ft/sec)^{1/2}$.

The method of any preceding clause, wherein the MSR is between two hundred twelve $(ft/sec)^{1/2}$ and two hundred sixty $(ft/sec)^{1/2}$.

The method of any preceding clause, wherein the MSR is between two hundred forty-seven $(ft/sec)^{1/2}$ and two hundred ninety $(ft/sec)^{1/2}$.

The method of any preceding clause, wherein the redline speed is between sixty and ninety ft/sec.

The method of any preceding clause, wherein the redline speed is between seventy-five and one hundred seventy-five ft/sec.

The method of any preceding clause, wherein the redline speed is between one hundred fifty and two hundred fifty ft/sec.

The method of any preceding clause, wherein the ratio of L/D is between twelve and twenty.

The method of any preceding clause, wherein the ratio of L/D is between sixteen and thirty.

The method of any preceding clause, wherein the ratio of L/D is between twenty-six and thirty-seven.

The method of any preceding clause, wherein the shaft is a composite shaft made of at least two different materials.

The method of any preceding clause, wherein the shaft has a length L and a reduced mass density at a midpoint along the length L.

The method of any preceding clause, wherein the shaft has a reduced mass density at a midpoint along the length L.

The method of any preceding clause, wherein the shaft is a hollow convex shaft with a reduced wall thickness at the midpoint, a variable inner diameter, and a constant outer diameter.

The method of any preceding clause, wherein the shaft is a hollow convex shaft with a reduced wall thickness at the midpoint, a constant inner diameter, and a variable outer diameter.

The method of any preceding clause, wherein the shaft is coupled to the power turbine at a first mounting point, and wherein the shaft is also coupled to one of the compressor sections at a second mounting point.

The method of any preceding clause, wherein the shaft is supported by at least a first bearing and a second bearing.

The method of any preceding clause, wherein the shaft has a length L that is measured as the distance between the first bearing and the second bearing.

The method of any preceding clause, wherein the length L is measured as the distance between the first bearing and the second bearing.

The method of any preceding clause, wherein at least one bearing is a duplex bearing that has an overturning moment capability.

The method of any preceding clause, wherein each bearing is one of a ball bearing and a roller bearing.

The method of any preceding clause, wherein the first bearing is positioned between the first mounting point and the second mounting point, and wherein the second mounting point is positioned between the first bearing and the second bearing.

The method of any preceding clause, wherein the first bearing and the second bearing support the shaft in an inbound configuration in which the first bearing and the second bearing are positioned between the first mounting point and the second mounting point.

The method of any preceding clause, wherein the first bearing and the second bearing support the shaft in an outbound configuration in which the first mounting point and the second mounting point are positioned between the first bearing and the second bearing.

The method of any preceding clause, wherein the shaft is further supported by a third bearing and a fourth bearing.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an inbound overturning moment configuration in which the first pair of duplex bearings and the second pair of duplex bearings are positioned between the first mounting point and the second mounting point.

The method of any preceding clause, wherein the first bearing and the second bearing are a first pair of duplex bearings, and the third bearing and the fourth bearing are a second pair of duplex bearings, wherein the first pair of duplex bearings and the second pair of duplex bearings support the shaft in an outbound overturning moment configuration in which the first mounting point and the second mounting point are positioned between the first pair of duplex bearings and the second pair of duplex bearings.

The method of any preceding clause, wherein the first bearing, the second bearing, the third bearing, and the fourth bearing support the shaft in a four-bearing straddle configuration in which the first bearing and the second bearing are positioned between the first mounting point and the second mounting point, and the first mounting point and the second mounting point are positioned between the third bearing and the fourth bearing.

The method of any preceding clause, wherein the first bearing, the second bearing, the third bearing, and the fourth bearing support the shaft in a four-bearing outbound configuration in which the first mounting point and the second mounting point are positioned between a first group of bearings comprising the first bearing and the second bearing, and a second group of bearings comprising the third bearing and the fourth bearing.

Although the foregoing description is directed to certain embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A method of operating a turbomachine engine including a power turbine and a shaft that is coupled to the power turbine, the method comprising:
    driving the shaft, wherein the shaft is characterized by a midshaft rating (MSR) between two hundred $(ft/sec)^{1/2}$ and three hundred $(ft/sec)^{1/2}$; and
    operating the turbomachine engine up to a redline speed without passing through a critical speed associated with a first-order bending mode of the shaft.

2. The method of claim 1, wherein the MSR is between two hundred $(ft/sec)^{1/2}$ and two hundred forty-five $(ft/sec)^{1/2}$.

3. The method of claim 1, wherein the MSR is between two hundred twelve $(ft/sec)^{1/2}$ and two hundred sixty $(ft/sec)^{1/2}$.

4. The method of claim 1, wherein the MSR is between two hundred forty-seven $(ft/sec)^{1/2}$ and two hundred eighty-seven $(ft/sec)^{1/2}$.

5. The method of claim 1, wherein the redline speed is between fifty ft/sec and two hundred fifty ft/sec.

6. The method of claim 1, wherein the redline speed is between sixty ft/sec and ninety ft/sec.

7. The method of claim 1, wherein the redline speed is between seventy-five ft/sec and one hundred seventy-five ft/sec.

8. The method of claim 1, wherein the redline speed is between one hundred fifty ft/sec and two hundred fifty ft/sec.

9. The method of claim 1, wherein the shaft is supported between a first bearing and a second bearing, and the shaft has a length L defined between the first bearing and the second bearing, an outer diameter D, and a ratio of L/D between twelve and thirty-seven.

10. The method of claim 9, wherein the ratio of L/D is between sixteen and thirty.

11. The method of claim 9, wherein the ratio of L/D is between twenty-six and thirty-seven.

12. The method of claim 1, wherein the shaft is a low-speed shaft, and the turbomachine engine further includes a high-pressure compressor, a high-pressure turbine, and a high-speed shaft that couples the high-pressure compressor and the high-pressure turbine, and the method further comprises driving the high-speed shaft with the high-pressure turbine to rotate the high-pressure compressor.

13. The method of claim 12, wherein the turbomachine engine further includes a combustion chamber, and the method further comprises combusting fuel and air in the combustion chamber to generate combustion gases, and driving the high-pressure turbine and the power turbine with the combustion gases.

14. The method of claim 1, wherein the turbomachine engine further includes a fan assembly, and the shaft is coupled to the fan assembly, and the method further comprises driving, by the power turbine, the fan assembly via the shaft.

15. The method of claim 14, wherein the turbomachine engine further includes a power gearbox that couples the fan assembly to the shaft, and the method further comprises decreasing, with the power gearbox, a rotational speed of the fan assembly relative to the shaft.

16. A method of operating a turbomachine engine including a fan assembly, a high-pressure compressor, a high-pressure turbine, a high-speed shaft that couples the high-pressure compressor and the high-pressure turbine, and a combustion chamber that is in flow communication with the high-pressure compressor and the high-pressure turbine, a power turbine that is in flow communication with the high-pressure turbine, and a low-speed shaft that is coupled to the power turbine and the fan assembly, the method comprising:
    combusting fuel and air in the combustion chamber to generate combustion gases;
    driving the high-pressure turbine with the combustion gases;
    driving the high-pressure compressor with the high-pressure turbine via the high-speed driving the power turbine with the combustion gases;
    shaft;
    driving the fan assembly with the power turbine via the low-speed shaft;

driving the low-speed shaft, wherein the low-speed shaft is characterized by a midshaft rating (MSR) between two hundred $(ft/sec)^{1/2}$ and three hundred $(ft/sec)^{1/2}$; and operating the turbomachine engine up to a redline speed without passing through a critical speed associated with a first-order bending mode of the low-speed shaft.

17. The method of claim 16, wherein the MSR is between two hundred $(ft/sec)^{1/2}$ and two hundred forty-five $(ft/sec)^{1/2}$.

18. The method of claim 16, wherein the redline speed is between fifty ft/sec and two hundred fifty feet per second ft/sec.

19. The method of claim 16, wherein the low-speed shaft is supported between a first bearing and a second bearing, and the low-speed shaft has a length L defined between the first bearing and the second bearing, an outer diameter D, and a ratio of L/D between twelve and thirty-seven.

20. The method of claim 16, wherein the turbomachine engine further includes a power gearbox that couples the fan assembly to the low-speed shaft, and the method further comprises decreasing, with the power gearbox, a rotational speed of the fan assembly relative to the low-speed shaft.

* * * * *